United States Patent
Fleetman et al.

[15] 3,671,861
[45] June 20, 1972

[54] CALIBRATION DEVICE FOR ELECTRIC METER INCLUDING A CONTROL MAGNET MOUNTED ON A FLEXIBLE ARM

[72] Inventors: Hobart H. Fleetman, Perkasie; Harry E. Wohlbach, Allentown, both of Pa.

[73] Assignee: Electro-Mechanical Instrument Company, Inc.

[22] Filed: April 8, 1965

[21] Appl. No.: 446,745

[52] U.S. Cl. ............................................324/146, 324/154
[51] Int. Cl. .........................................G01r 5/16, G01r 1/20
[58] Field of Search .........................................324/196, 154

[56] References Cited

UNITED STATES PATENTS

| | | | |
|---|---|---|---|
| 2,867,768 | 1/1959 | Fribance | 324/146 |
| 2,954,526 | 9/1960 | Pfeffer | 324/154 X |
| 3,094,659 | 6/1963 | Pfeffer | 324/154 X |
| 2,970,267 | 1/1961 | Pfeffer | 324/146 |

*Primary Examiner*—Gerard R. Strecker
*Attorney*—Woodcock, Washburn, Kurtz & Mackiewicz

[57] ABSTRACT

An electrical meter having a movement magnet and a control magnet for zeroing the meter pointer and also adjusting the meter sensitivity. The control magnet is pivotally mounted for rotation on a flexible arm. Zeroing of the meter is obtained by rotating the control magnet relative to the movement magnet. The sensitivity of the meter is adjusted by varying the distance between the movement magnet and control magnet by means of the flexible arm.

7 Claims, 7 Drawing Figures

PATENTED JUN 20 1972 3,671,861
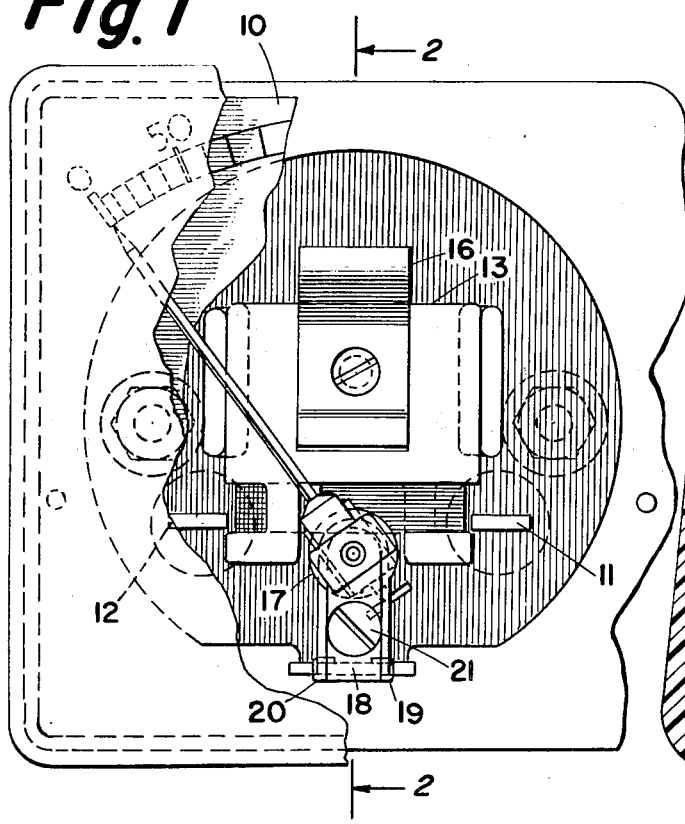
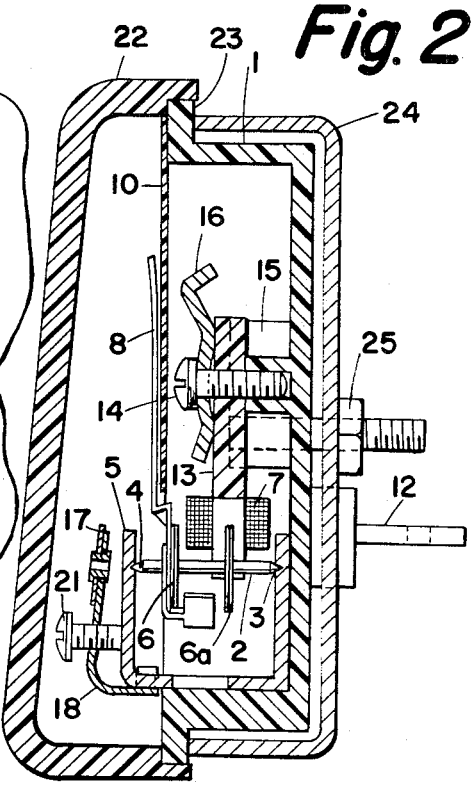
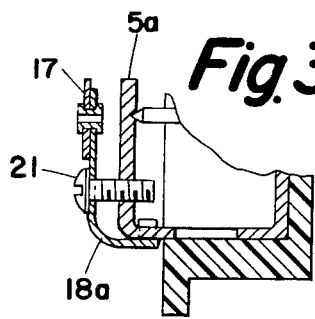
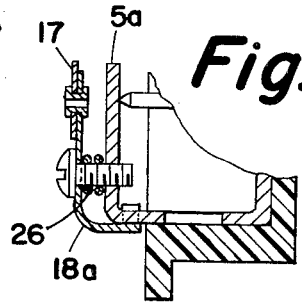
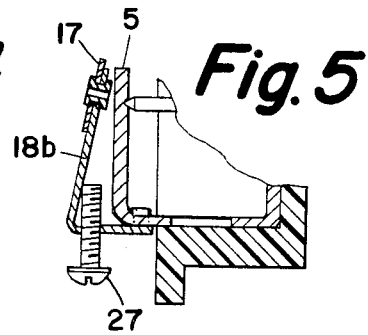
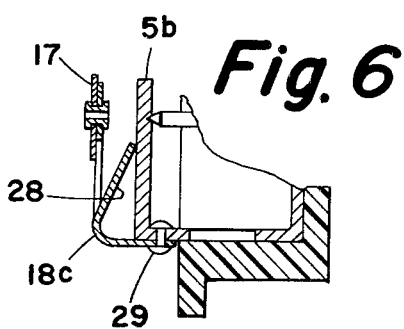
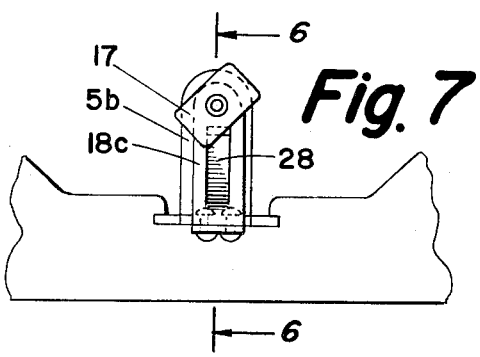

CALIBRATION DEVICE FOR ELECTRIC METER INCLUDING A CONTROL MAGNET MOUNTED ON A FLEXIBLE ARM

This invention relates to electrical meters and, more particularly, to an improved calibration device for adjusting the sensitivity of a meter.

Electrical meters have a sensitivity which is not always known. That is, the scale deflection, for a given amount of voltage applied to the coil or current through the coil, will not always be the same for all meters due to variations in magnetic material and nominal variations in the positioning of the components. For this reason it is necessary to provide means for adjusting the sensitivity of the meter after it has been constructed.

In such meters it is quite important that the calibrating or adjusting means be of a type which is simple in construction; that the parts permit accurate adjustment to the desired sensitivity; that this adjustment once obtained be positive and permanent; and that the adjusting means be in a position which is readily accessible after the meter has been constructed.

Accordingly, it is an important object of the present invention to provide a calibration device for an electric meter which has all of the aforesaid desired advantages.

In accordance with one embodiment of the invention there is provided a meter of the type including a movement bracket having upper and lower bearing seats for mounting a movement assembly. A magnetic movement assembly including an arbor having two pointed ends is inserted in the bearing seats. This movement assembly includes at least one movement magnet positioned in proximity to a coil. Energization of the coil produces flux which interacts with the movement magnet to deflect a pointer mounted on the arbor.

In order to provide means for adjusting the zero of the pointer relative to the scale, a control magnet is provided. This control magnet is pivoted for rotation relative to the movement magnet so that positioning of the arbor will be produced to locate the zero position of the arbor will be produced to locate the zero position of the pointer relative to the scale. This control magnet also serves the function of exerting a restoring force on the movement assembly. That is, when current through the energizing coil is reduced, the control magnet will exert a force on the movement assembly which tends to restore the pointer to its zero position.

In accordance with an important aspect of this invention the control magnet serves still another function. The control magnet is mounted on a flexible arm of non-ferrous material. This flexible arm is affixed at one end thereof to the movement bracket. The control magnet is mounted on the other end of the flexible arm. The sensitivity of the meter can be changed by adjusting the distance between the control magnet and the movement magnet.

In accordance with this invention this adjustment can be performed quite easily because the flexible arm provides a means for easily varying this distance between the control magnet and movement magnet, or magnets. This arrangement of a flexible arm carrying the control magnet has all of the advantages which are desired in a calibration device. That is, the arm is readily accessible at the front of the meter for adjustment, the flexible arm arrangement provides means for obtaining an accurate adjustment of the sensitivity, and once set the arm will permanently retain the adjustment.

The foregoing and other objects, features and advantages of the present invention will be better understood with reference to the following more detailed description and appended claims together with the drawings in which:

FIG. 1 shows a front view of the meter with parts cut away;

FIG. 2 shows a side view of the meter on the line 2—2 of FIG. 1;

FIGS. 3, 4, and 5 each show alternate embodiments of the invention;

FIG. 6 shows a side view of another embodiment of the invention; and

FIG. 7 shows a front view of the modification of FIG. 6.

Referring now to FIGS. 1 and 2 there is shown a cuplike casing 1 which may be of plastic or any other suitable non-magnetic material or of ferrous and non-ferrous materials. Mounted within the casing 1 is a movement assembly which includes an arbor 2 having two pointed ends which are inserted in bearings 3 and 4 in a movement bracket 5. Commonly, the bearings are merely small indentations or may be jewelled bearings in the movement bracket 5. The movement bracket 5 is U-shaped and is fixedly mounted in the casing 1.

There is mounted on the arbor 2 at least one movement magnet. As shown in FIGS. 1 and 2, there is an upper movement magnet 6 and a lower movement magnet 6a both mounted on the arbor 2 for rotation with the arbor. The two magnets 6 and 6a are fixedly mounted on arbor 2 with respect to one another.

Two movement magnets are provided for the purpose of minimizing the effect of external magnetic fields on the meter. When the meter is placed in a position in which a stray magnetic field, such as the earth's magnetic field, is particularly strong, the magnetic field could interact with a movement magnet produce an offset of the zero position of the pointer. This is commonly referred to as a "compassing effect".

The use of two movement magnets counteracts this compassing effect. The two movement magnets 6 and 6a are mounted on the arbor 2 so that opposite magnetic poles of the two magnets are adjacent to one another. For example, assume that the magnet 6 is polarized such that there is a north pole at the top and a south pole at the bottom. Then the magnet 6a would be polarized such that there would be a south pole at the top and a north pole at the bottom. When the two magnets are mounted in this manner, the effect of an external magnetic field will be cancelled because the field will interact with one magnet to produce a torque in one direction and will interact with the other magnet to exert a torque in the opposite direction. Thus, if the two torques are cancelled, there is eliminated the effect of external magnetic fields on the zero setting of the meter.

The movement magnet 6a is disposed within a coil 7. With the movement magnet 6a disposed within the coil and the movement magnet 6 disposed outside of the coil, the flux produced by energization of the coil will have an additive effect on the two magnets thereby resulting in rotation of the arbor 2. A pointer 8 is mounted on the arbor 2 and will rotate with the arbor to sweep across a scale 10 which is mounted on the lips of the cuplike casing 1.

Flux will be produced in the coil 7 by reason of current from an external source flowing through the coil. This external source is connected to terminal posts 11 and 12 which are electrically connected to the ends of the coil 7.

The coil 7 is wound on a coil form 13 which may be of any suitable dielectric material. The coil form 13 is secured to the meter casing and is slideably mounted so that the position of the coil can be adjusted relative to the movement magnet 6a. This permits an additional adjustment of the sensitivity of the meter. The mounting of the coil form 13 is by way of a screw 14 threaded into protuberance 15 of the meter casing. The screw 14 extends through a tension spring 16. As the screw is threaded inwardly, the tension spring 16 is deformed so as to hold the coil form 13 in place. However, the force exerted by the tension spring 16 is such that the coil form 13 can slide toward or away from the movement magnet 6a when pressure is exerted to make an adjustment in sensitivity. It will be appreciated that as the coil 7 is moved away from the movement magnet 6a the coil will exert less torque on the movement magnet 6a and the sensitivity will decrease.

In order to provide another sensitivity adjustment, a control magnet 17 is mounted so that its flux interacts with the flux of the movement magnet 6. The control magnet 17 serves three functions. First, it is pivotally mounted so that it can be rotated about the axis of the arbor 2. By rotating the control magnet 17 about this axis, there can be adjusted the zero position of the pointer with respect to the scale. That is, as the control magnet 17 is rotated, its flux interacts with the flux of movement magnet 6 to rotate the arbor and the pointer mounted thereon to the proper zero position.

The second function performed by the control magnet 17 is that of exerting a restoring force on the movement assembly. After the pointer has moved upscale under the influence of the coil flux, and the current through the coil then decreases, it is necessary to exert a restoring force which will return the pointer to the zero position. The interaction between the flux of the control magnet 17 and the flux of the movement magnet 6 exerts such a restoring force.

The third function performed by the control magnet 17 is that of providing an accessible, accurate and permanent calibrating device. In accordance with this invention, the control magnet is adapted to serve as a calibrating device by mounting it on the flexible arm or clip 18. The flexible arm 18 is generally L-shaped and has a short leg and a longer leg. The short leg of the flexible arm 18 is mechanically affixed at one end to the movement bracket 5. As shown in FIG. 2 the flexible arm 18 is affixed to the bracket 5 by means of tabs 19 and 20 which are bent around the bracket 5. The control magnet 17 is pivotally mounted on the longer leg which is positioned on the side of the scale 10 which is away from the casing 1. This provides easy access to the flexible arm 18.

When it is desired to change the sensitivity of the meter, the control magnet 17 can be moved toward or away from the movement magnet 6. This is possible by reason of the flexible nature of the arm 18. In order that the distance between movement magnet 6 and the control magnet 17 may be set accurately and permanently, a screw 21 is threaded through the flexible arm 18 and bears against the movement bracket 5. The flexible arm 18 is moved or borne toward or away from the movement magnet 6 as the arm rides the threads of screw 21. When the control magnet 17 is moved away from movement magnet 6, the sensitivity of the meter is increased. That is, when the control magnet is further from the movement magnet 6 the restoring torque exerted by reason of the interaction of the two magnets is decreased. With less restoring torque applied to the arbor 2, there will be a greater deflection of the pointer for a given current through the coil. Conversely, when the control magnet is moved closer to the movement magnet 6, then the restoring torque exerted by reason of the interaction between the two magnets is increased and there will be a smaller deflection of the pointer for a given flow of current through the coils; that is, the sensitivity is decreased.

The adjusting screw 21 is readily accessible after the meter is assembled because the front cover face 22 slips off of the casing 1. If the front cover 22 is constructed of a plastic, the suitable catches engage with suitable recesses of the flange 23 around the periphery of the casing 1 to provide a snap-fit with the front cover 22 on casing 1. When the meter has been mounted, it may be desirable to insert a ferrous cover shield 24 over the casing 1. This shields the meter from stray magnetic fields. The shield and casing are secured together by a nut 25 threaded on a screw which extends through the casing.

Now that the principal embodiment of the invention has been described, it will be understood that many modifications can be made without departing from the principles of the invention. Some of these modifications are shown in FIGS. 3–7 wherein like reference numerals denote like parts. In FIG. 3 the flexible arm 18a does not have a threaded hole through which the screw protrudes. Rather, the movement bracket 5a has the threaded hole to receive the screw 21. The screw 21 can now be threaded through this hole to urge or to bear the flexible arm 18a toward the movement magnet. The flexible arm 18a has a natural bias away from the movement magnet. The screw 21 urges the flexible arm toward the movement magnet thereby setting the control magnet 17 at the proper position. In this embodiment the arm 18a must have enough outward bias so that the arm follows the setting of the screw 21.

In the embodiment of FIG. 4 a spring is used to supplement or replace the outward bias of the arm. In this embodiment a spring 26 is placed on the screw between the bracket 5a and the flexible arm 18a. This spring provides outward bias so that the flexible arm 18a will move or be borne away from the movement magnet when the screw is turned in this direction.

Another embodiment of the invention is shown in FIG. 5. In this embodiment the flexible arm 18b is normally biased toward the movement magnet. Adjustment is provided by threading a screw 27 through a hole in the back of the flexible arm. The screw exerts a sidewise pressure on 18b causing an outward movement of the flexible arm 18b and thus urges or bears the control magnet 17 away from the movement magnet.

Still a further embodiment of the invention is shown in FIGS. 6 and 7. In this embodiment the flexible arm 18c has a tongue portion 28 which is cut out of the center of the flexible arm 18c. This tongue 28 can be bent so that it bars against the movement bracket 5b. By bending the tongue 28 to the correct position, the desired distance between control magnet 17 and the movement magnet can be obtained. It will be noted that the embodiment of FIG. 6 differs in one further feature in that the flexible arm 18c is attached to the movement bracket 5 by means of a rivet 29. This shows an alternative fastening which may be employed instead of the tabs 19 and 20 in FIG. 1.

While particular features of the invention have been shown and described, it will, of course, be understood that various modifications may be made without departing from the principles of the invention. The appended claims are therefore intended to cover any such modifications within the true spirit and scope of the invention.

What is claimed is:

1. An electrical meter comprising:
a pivoted movement assembly including at least one movement magnet,
a scale,
a pointer mounted on said movement assembly and positioned for movement over said scale,
a coil producing magnetic flux which interacts with said movement magnet to move said pointer over said scale in response to current through said coil,
a control magnet pivotally mounted for rotation relative to said movement magnet for adjustment of the zero position of said pointer relative to said scale, the interaction between said control magnet and said movement magnet acting to restore said pointer to said zero position when said current through said coil is reduced,
a flexible arm of nonferrous material mounted on said meter and spaced from said movement magnet, said control magnet being pivotally attached to a biased end of said arm, said biased end of said arm being movable relative to said movement magnet, and
a screw adjustment means bearing upon said flexible arm for adjusting the distance between said biased end of said flexible arm and said movement magnet and thus adjusting the sensitivity of said meter.

2. The electrical meter recited in claim 1 further including:
a movement bracket fixedly mounted in said meter, said movement bracket being U-shaped and having bearing seats in two arms thereof, said movement assembly being pivoted in said bearing seats, said flexible arm being affixed at one end thereof to said movement bracket, the other end of said flexible arm being movable to adjust the distance between said control magnet and said movement magnet.

3. An electrical meter comprising:
a pivoted movement assembly including at least one movement magnet,
a scale,
a pointer mounted on said movement assembly and positioned for movement over said scale,
a coil producing magnetic flux which interacts with said movement magnet to move said pointer over said scale in response to current through said coil, a control magnet pivotally mounted for rotation relative to said movement magnet for adjustment of the zero position of said pointer relative to said scale, the interaction between said control magnet and said movement magnet acting to restore said pointer to said zero position when said current through said coil is reduced, a flexible arm of non-ferrous material, said control magnet being pivotally attached to said arm, said arm being movable to adjust the distance between said control magnet and said movement magnet to adjust the sensitivity of said meter, a movement bracket fixedly mounted in said meter, said movement bracket being U-shaped and having bearing seats in two arms thereof, said movement assembly being pivoted in said bearing seats, said flexible arm being affixed at one end thereof to said movement bracket, the other end of said flexible arm being movable to adjust the distance between said control magnet and said movement magnet, and an adjusting screw, said flexible arm having a threaded opening such that said adjusting screw may be threaded therein to bear against said movement bracket to adjust the distance between said control magnet and said movement magnet.

4. An electrical meter comprising:

a pivoted movement assembly including at least one movement magnet, a scale, a pointer mounted on said movement assembly and positioned for movement over said scale, a coil producing magnetic flux which interacts with said movement magnet to move said pointer over said scale in response to current through said coil, a control magnet pivotally mounted for rotation relative to said movement magnet for adjustment of the zero position of said pointer relative to said scale, the interaction between said control magnet and said movement magnet acting to restore said pointer to said zero position when said current through said coil is reduced, a movement bracket fixedly mounted in said meter, said movement bracket being substantially U-shaped and having bearing seats in two arms thereof, said movement assembly being pivoted in said bearing seats, a flexible arm of non-ferrous material, said control magnet being pivotally attached to said arm, said arm being affixed to said movement bracket, said arm being movable relative to said movement magnet to adjust the distance between said control magnet and said movement magnet, an adjusting screw, said movement bracket having a threaded opening therein and said flexible arm having an opening therein for receiving said adjusting screw, said adjusting screw being positioned in said opening in said flexible arm and threaded into said threaded opening in said bracket so that said adjusting screw can be turned to adjust the distance between said control magnet and said movement magnet.

5. The meter recited in claim 4 further including:

a coil spring positioned on said adjusting screw between said movement bracket and said flexible arm to provide bias so that said flexible arm will move in both directions in response to turning of said adjusting screw.

6. An electrical meter comprising:

a pivoted movement assembly including at least one movement magnet, a scale, a pointer mounted on said movement assembly and positioned for movement over said scale, a coil producing magnetic flux which interacts with said movement magnet to move said pointer over said scale in response to current through said coil, a control magnet pivotally mounted for rotation relative to said movement magnet for adjustment of the zero position of said pointer relative to said scale, the interaction between said control magnet and said movement magnet acting to restore said pointer to said zero position when said current through said coil is reduced, a flexible, substantially L-shaped arm of non-ferrous material mounted on said meter and spaced from said movement magnet, said control magnet being pivotally attached to one end of said arm, said arm being movable relative to said movement magnet to adjust the distance between said control magnet and said movement magnet to adjust the sensitivity of said meter, wherein said arm has a short leg and a longer leg, said short leg having a threaded opening, and an adjusting screw received by said threaded opening so that said adjusting screw bears against said longer leg to adjust the distance between said control magnet and said movement magnet.

7. An electrical meter comprising:

a pivoted movement assembly including at least one movement magnet, a scale, a pointer mounted on said movement assembly and positioned for movement over said scale, a coil producing magnetic flux which interacts with said movement magnet to move said pointer over said scale in response to current through said coil, a control magnet pivotally mounted for rotation relative to said movement magnet for adjustment of the zero position of said pointer relative to said scale, the interaction between said control magnet and said movement magnet acting to restore said pointer to said zero position when said current through said coil is reduced, a movement bracket for supporting said movement assembly, and a flexible, substantially L-shaped arm of non-ferrous material affixed to said movement bracket, said control magnet being pivotally attached to one end of said arm, said arm being movable relative to said movement magnet to adjust the distance between said control magnet and said movement magnet to adjust the sensitivity of said meter, wherein said arm has a short leg and a longer leg, said longer leg having a cut-out tongue portion therein, said cut-out tongue portion being adjustable to bear against said movement bracket to adjust the distance between said control magnet and said movement magnet.

* * * * *

UNITED STATES PATENT OFFICE
CERTIFICATE OF CORRECTION

Patent No. 3,671,861          Dated June 20, 1972

Inventor(s) HOBART H. FLEETMAN

It is certified that error appears in the above-identified patent and that said Letters Patent are hereby corrected as shown below:

Column 1, line 38, after "of the arbor" delete --will be produced to locate the zero position of the pointer--;

Column 2, line 22, after "magnet" insert --to--;

Column 4, line 15, delete "bars" and substitute therefor --bears--;

Signed and sealed this 14th day of November 1972.

(SEAL)
Attest:

EDWARD M. FLETCHER, JR.
Attesting Officer

ROBERT GOTTSCHALK
Commissioner of Patents